Dec. 18, 1923.  
E. T. MILLER  
BERRY CAP AND STEM REMOVER  
Filed March 3, 1922  
1,477,839  
2 Sheets-Sheet 1
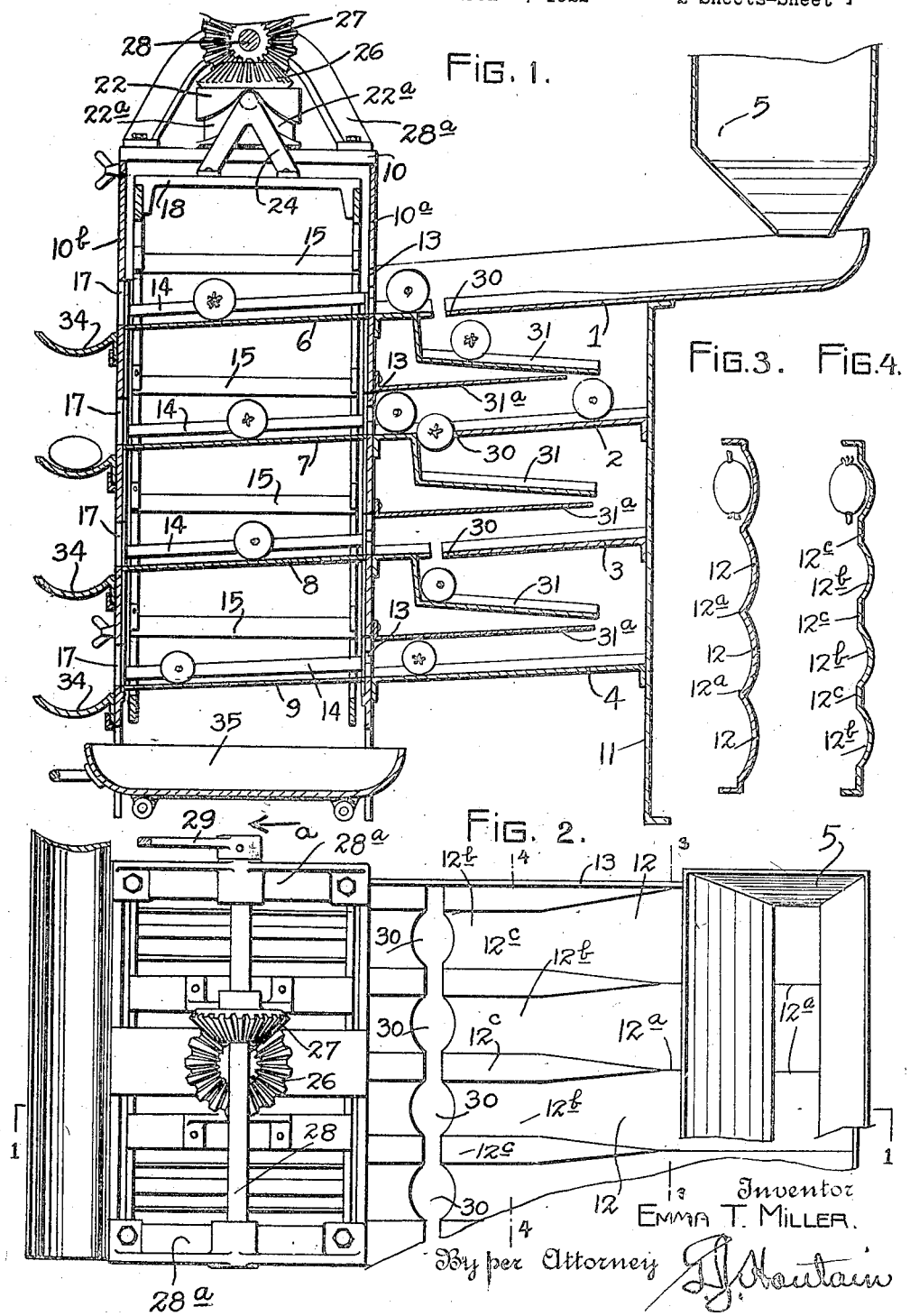

Dec. 18, 1923.  
E. T. MILLER  
BERRY CAP AND STEM REMOVER  
Filed March 3, 1922

Inventor  
EMMA T. MILLER.  
By her Attorney

Patented Dec. 18, 1923.

1,477,839

UNITED STATES PATENT OFFICE.

EMMA T. MILLER, OF SAN ANTONIO, TEXAS.

BERRY CAP AND STEM REMOVER.

Application filed March 3, 1922. Serial No. 540,776.

*To all whom it may concern:*

Be it known that I, EMMA T. MILLER, a citizen of the United States, and resident of San Antonio, in the county of Bexar and State of Texas, have invented certain new and useful Improvements in Berry Caps and Stem Removers, of which the following is a specification.

This invention relates to fruit stemming machines, having reference particularly to an improved apparatus for removing the stems and caps of gooseberries.

The invention has for an object the provision of an inexpensive, simply constructed and readily operable apparatus adapted for mechanically removing the stems and caps of the berries; a further object of the invention is to provide an apparatus of such construction as to operate without liability of bruising the fruit; still further objects of the invention being to provide means for feeding fruit through the apparatus and means for automatically grading the fruit as it passes therethrough.

These and other objects I attain by employing grooved inclined runways, means for feeding berries through said runways, inclined discharge channels for receiving berries from said runways, reciprocating knives, fixed knives, means for operating said knives, means for mounting the parts, and other novel features all as hereinafter described and broadly set forth in the appended claims.

In the accompanying drawings forming part of this specification, Figure 1 is a longitudinal sectional view of an embodiment of my improvements, taken on the line 1—1 of Fig. 2;

Fig. 2 is a plan view, parts of the apparatus being broken away.

Fig. 3 is a cross section taken on the line 3—3 of Fig. 2;

Fig. 4 is a cross section taken on the line 4—4 of Fig. 2;

Figure 5:
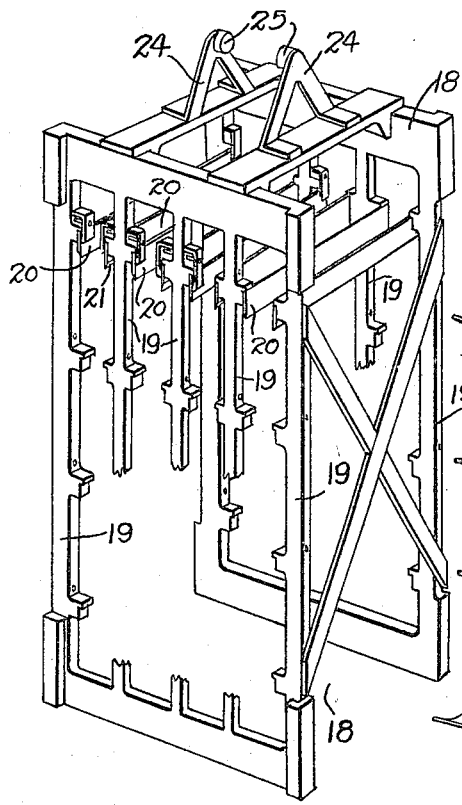
Fig. 5 is a perspective view of a reciprocative frame for mounting the reciprocative knives forming part of my invention.
Figure 6:
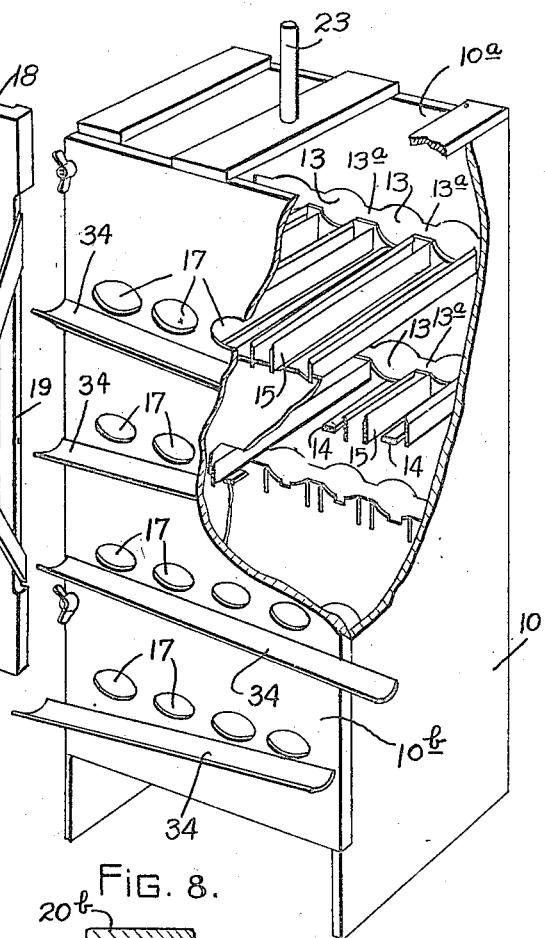
Fig. 6 is a perspective view of a stationary frame for mounting the fixed knives.
Figure 7:
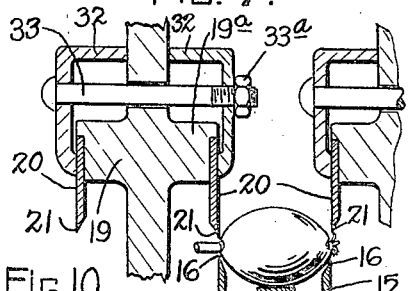
Fig. 7 is a fragmentary cross section illustrating the knife-elements.

In the example of my invention illustrated by the drawings, 1, 2, 3 and 4 indicate inclined runways for conducting berries from a hopper 5 to discharge channels 6, 7, 8 and 9; all of said parts being supported by a suitable frame, as 10, adapted to rest upon a horizontal plane surface, an additional frame-member 11, being provided as an extra support. However, I do not confine myself to any specific mounting means.

The bottoms of said runways, are respectively provided with a plurality of grooves 12, which are segmental in cross section forming channels through which the berries may freely roll. The grooves 12 of said runways converge laterally at their points of intersection, forming ridges $12^a$ for separating the berries, and they respectively converge into a laterally contracted groove-extension $12^b$, said extension having parallel sides which are connected by bridges $12^c$. The said ridges $12^a$ automatically cause the berries to roll into the grooves 12 and prevent them from rolling on the flat bridges $12^c$ located between the groove-extensions $12^b$.

The groove-extensions $12^b$ open into and are in register with openings 13 of the wall $10^a$ of the frame 10, said openings being of such proportion as to allow the berries from the runways to pass freely therethrough, and they are laterally spaced apart by connecting ways $13^a$, through which the stems and caps of the berries may pass.

Leading downwardly and obliquely from each opening 13, is a discharge channel comprising a plate 14 which is fixed at one end to the rear wall $10^a$, and at the other to the front wall $10^b$ of the frame 10, and side plates 15 having each a beveled edge 16, constituting a knife, each of said channels emptying through an opening 17, of the front wall $10^b$ of the frame 10, through which the stemmed and capped berries may be discharged, as hereinafter described.

Arranged within the frame 10 is a reciprocating frame 18 having upright members 19, to which are attached knives 20 which are composed preferably of thin, resilient metal having beveled cutting edges 21 to be employed in conjunction with the knives 15 for cutting the stems and caps from the berries. The knives 20 are extended at an angle to the knives 15, whereby the ends thereof adjacent to the inlets for the berries are first brought into conjunction with the knives 15, whereby the cutting of the berry caps and stems is accomplished by a shearing action, as hereinafter described.

The reciprocative frame 18 is dependingly supported by means of a rotatable cam 22, which is mounted on a spindle 23 extended upwardly from the stationary frame 10, hangers 24, which are fixed to the frame 18, being employed for connecting the frame 18 with said cam, said hangers having studs 25 which bear in the cam-groove 22$^a$. Fixed to the upper end of the cam 22 is a bevel-gear wheel 26 which meshes with a similar gear wheel 27 mounted on a cross shaft 28 having a crank 29 mounted on one end thereof, whereby rotary motion may be imparted to the gear wheel 27 for the purpose of transmitting motion to the cam 22, said shaft 28 being journaled in standards 28$^a$.

The frame 18 is maintained normally in its uppermost position as shown in Fig. 1 of the drawings, thus placing the knives 20 in position over the knives 15, whereby rotation of the cam 22 moves said knives 20 downwardly.

The runways 1, 2, 3 and 4 are of differential proportion for accommodating varisized berries, the discharge channels being of corresponding differential proportions.

Each channel 12$^b$ of the runways 1, 2 and 3 is provided with an aperture 30 and a chute 31; and guide plates 31$^a$ are extended beneath the chutes 31, for maintaining the berries in alignment. The apertures of the runway 1 are of a size to allow the berries of maximum proportion to roll thereover whereby they may pass to the upper and largest outlet channel, the smaller sized berries being discharged by their own gravity through the aperture 30 on to the chute 31 therebeneath, from whence they are conducted to the rearward parts of the next lower runway, this operation being repeated until the berries of smallest size are conducted to the lowermost runway 4.

Figure 10:
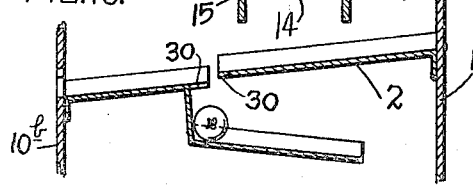
Fig. 10 is a fragmentary longitudinal sectional view showing a modified form of runway.

The runways may respectively comprise two adjacent sections extended on a common plane, as shown in Figures 1 and 2 of the drawings, but it may be found desirable to have one section slightly raised over the other, as shown in Fig. 10 of the drawings, whereby the larger berries may more readily jump over the apertures 30.

The knives 20 may be fixed to lugs 19$^a$ of the uprights 19 by means of clamps 32 and bolts and nuts 33 and 33$^a$, but I do not confine myself to this specific means for fastening.

As a means for conducting the graded berries laterally away from the device after they are discharged from the apertures 17, I provide oppositely directed inclined troughs 34 adapted to lead to separate receptacles for the different sized berries; these troughs are preferably detachably mounted on the wall 10$^b$ of the frame 10, by any suitable means, whereby they may be removed when it is desirable to mix the graded berries.

As a means for catching the severed caps and stems of the berries, I provide a suitable receptacle 35, which may be placed beneath the reciprocative frame, as shown in Fig. 1 of the drawings.

Figure 8:
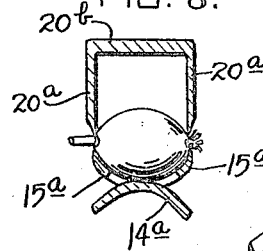
Fig. 8 is a similar view showing a modification.
Figure 9:
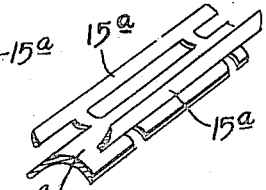
Fig. 9 is a perspective view showing a part of said modified construction.

In Figures 8 and 9 of the drawings I have illustrated a slightly modified knife-construction, wherein the discharge channels respectively comprise an integrally formed plate 14$^a$, which is segmental in cross section, and upwardly curved knife members 15$^a$; the reciprocative knives 20$^a$ also being formed integral with bridging member 20$^b$ adapted for attachment to the frame 18, by any suitable means.

In the embodiment of my improvements as illustrated by the drawings, I have simply shown but one example of an operative mechanical assemblage of the elements of my invention, but I do not confine myself to the specific details of mere mechanical construction and assemblage of parts as shown and described, as I believe that under the spirit of my invention I am entitled to the employment of such variation of mere mechanical details as may fall within the scope of the appended claims.

In the operation of my invention, berries of substantially egg-shaped contour, as gooseberries having respectively a cap and stem extended from the ends of their longitudinal axis, are fed from the hopper 5, directly into the runway 1, and allowed to roll through the machine by gravity, then the crank 29 is turned in the direction of the arrow $a$, Fig. 2 of the drawings, whereby reciprocating movement is transmitted to the frame 18, through the medium of the gear wheels 27, 26 and the cam 22, thus causing the knives 20 to move upwardly and downwardly whereby as the berries pass through the discharge channels, the knives 20 shear off their caps and stems, said knives working in conjunction with the fixed knives 15, the resiliency of the knives admitting of such shearing action without liability of bruising or crushing the berries and allowing for the operation on berries of slightly varying proportions. The berries will manifestly roll with their longitudinal axes extended laterally across the grooves of the runways without assistance of an operative, but if a berry should occasionally lodge within a groove with its longitudinal axis parallel with the groove, the operative may readily place it in proper position to prevent jamming of the berries located rearwardly of it.

By the use of this invention berries of the character named may be accurately sorted, capped and stemmed, thus I provide an efficient labor saving apparatus requiring but little skill in its successful manipulation and operation.

Having thus described my invention, what I claim as new and desire to secure by Letters Patent, is:—

1. In an apparatus for removing the caps and stems of berries, the combination of inclined runways, means for grading berries in said runways, discharge channels communicating with said runways and having fixed knives forming part thereof, reciprocative knives adapted to act in conjunction with said fixed knives, and means for operating said reciprocative knives, and means for mounting the parts.

2. In an apparatus of the character described, the combination of a hopper, runways beneath said hopper, means for grading berries in said runways, discharge channels communicating with said runways and having fixed knives forming part thereof, reciprocative knives adapted to act in conjunction with said fixed knives, and means for operating said reciprocative knives, and means for mounting the parts.

3. An apparatus of the character described, comprising a fixed supporting frame, a hopper, grooved runways beneath said hopper, grading means within said runways, and grooved outlet channels communicating with the grooves of said runways, and a reciprocating frame, and knives carried thereby, and means for transmitting reciprocating movement to said frame, and fixed knives adapted to act in conjunction with the reciprocating knives for the purpose of shearing caps and stems for berries.

4. An apparatus of the character described comprising a fixed supporting frame, a hopper carried by said frame, grooved runways beneath said hopper for receiving berries therefrom, the grooves of said runways having apertures therethrough and chutes beneath said apertures, and guide plates beneath said chutes, and outlet channels communicating with the grooves of said runways and having fixed knives forming part thereof, the grooves of said runways and the outlet channel being of differential proportions, and a reciprocating frame and knives carried thereby, and means for transmitting reciprocating movement to said frame.

5. In an apparatus of the character described, the combination of a fixed supporting frame, a hopper, grooved runways beneath said hopper for receiving berries therefrom, the grooves of said runways having apertures therethrough, and chutes beneath said apertures, and guide plates beneath said chutes, and outlet channels communicating with the grooves of said runways and having fixed knives forming part thereof, the grooves of said runways and the outlet channels being of differential proportions, and a reciprocating frame and knives carried thereby, said fixed knives adapted to act in conjunction with said reciprocating knives, and bevel wheels and a cam reciprocating said frame, and a shaft and crank for rotating said wheels.

6. In an apparatus of the character described, a plurality of inclined runways, and means for grading berries in said runways, and a plurality of discharge channels leading from said runways, said channels having fixed knives on their sides, and reciprocative knives adapted to act in conjunction with said fixed knives, and means for imparting reciprocating movement to said knives.

Signed at San Antonio, in the county of Bexar and State of Texas, this 19th day of October, A. D. 1921.

EMMA T. MILLER.